United States Patent [19]

Vogel

[11] Patent Number: 5,467,447
[45] Date of Patent: Nov. 14, 1995

[54] DOCUMENT MARKING SYSTEM EMPLOYING CONTEXT-SENSITIVE EMBEDDED MARKING CODES

[76] Inventor: Peter S. Vogel, 608 N. Sierra Dr., Beverly Hills, Calif. 90210

[21] Appl. No.: 736,482

[22] Filed: Jul. 26, 1991

Related U.S. Application Data

[63] Continuation-in-part of Ser. No. 548,904, Jul. 24, 1990.
[51] Int. Cl.⁶ .................................................... G06F 17/00
[52] U.S. Cl. ............................................ 395/145; 395/148
[58] Field of Search .................................... 395/144–149, 395/155, 156, 161; 382/34; 209/566; 235/380, 61.7 B; 364/DIG. 2

[56] References Cited

U.S. PATENT DOCUMENTS

| | | | |
|---|---|---|---|
| 3,652,828 | 3/1972 | Sather et al. | 209/566 |
| 4,025,759 | 5/1977 | Scheffel | 235/61.7 B |
| 4,158,433 | 6/1979 | Peterson et al. | 235/380 |
| 4,480,179 | 10/1984 | Schaefer et al. | 235/473 |
| 4,783,760 | 11/1988 | Carosso | 364/DIG. 2 |
| 4,908,873 | 3/1990 | Philibert et al. | 382/34 |

FOREIGN PATENT DOCUMENTS

| | | |
|---|---|---|
| 3662884 | 6/1985 | Australia . |
| 8505713 | 12/1985 | WIPO . |

*Primary Examiner*—Almis R. Jankus
*Attorney, Agent, or Firm*—Cushman, Darby & Cushman

[57] ABSTRACT

A system for generating documents which, as well as presenting the usual alpha-numeric text information, contain a distinctive marking. The marking scheme of the invention can convey identifying information which, in the event of a document coming into the possession of an unauthorized person, allows a particular copy of a document to be traced to its source. The invention can also be used to distinctively identify each of a number of photocopies made from an original document.

35 Claims, 11 Drawing Sheets

This is an example of how a piece of text is marked. The spaces between words are varied according to a correspondence between bits of a ten-bit word which encodes alpha-numeric data into the text. By producing unique copies of confidential documents with the names of recipients encoded, recipients are deterred from leaking the document, for example by photocopying, because they fear that the leaked copy will be found and traced back to them. The marking is repeated throughout the text, so that it can be decoded even if only a small fragment of the document is recovered.

AN EXAMPLE OF A TABLE

|            | March  | April  | May    | June   |
|------------|--------|--------|--------|--------|
| Beans      | 1,2800 | 2,580  | 16,291 | 44     |
| Potatoes   | 110    | 2,210  | 65     | 21,180 |
| Apples     | 2,990  | 1,660  | 995    | 1,660  |
| Almonds    | 2,850  | 2,780  | 2,100  | 1,990  |
| Grapefruit | 7,520  | 880    | 1,280  | 5,600  |
| Mandarins  | 20,228 | 20,448 | 20,919 | 20,010 |
| Mangos     | 1,110  | 1,200  | 962    | 988    |
| Cabbages   | 18,420 | 18,660 | 18,611 | 16,710 |
| Lettuce    | 66     | 94     | 180    | 122    |
| Squash     | 18,435 | 14,991 | 18,000 | 17,200 |

Fig. 2

This is an example of how a piece of text is marked. The spaces between words are varied according to a correspondence between bits of a ten-bit word which encodes alpha-numeric data into the text. By producing unique copies of confidential documents with the names of recipients encoded, recipients are deterred from leaking the document, for example by photocopying, because they fear that the leaked copy will be found and traced back to them. The marking is repeated throughout the text, so that it can be decoded even if only a small fragment of the document is recovered.

AN EXAMPLE OF A TABLE

|            | March  | April  | May    | June   |
|------------|--------|--------|--------|--------|
| Beans      | 1,2800 | 2,580  | 16,291 | 44     |
| Potatoes   | 110    | 2,210  | 65     | 21,180 |
| Apples     | 2,990  | 1,660  | 995    | 1,660  |
| Almonds    | 2,850  | 2,780  | 2,100  | 1,990  |
| Grapefruit | 7,520  | 880    | 1,280  | 5,600  |
| Mandarins  | 20,228 | 20,448 | 20,919 | 20,010 |
| Mangos     | 1,110  | 1,200  | 962    | 988    |
| Cabbages   | 18,420 | 18,660 | 18,611 | 16,710 |
| Lettuce    | 66     | 94     | 180    | 122    |
| Squash     | 18,435 | 14,991 | 18,000 | 17,200 |

Fig. 3

This is an example of how a piece of text is marked. The spaces between words are varied according to a correspondence between bits of a ten-bit word which encodes alpha-numeric data into the text. By producing unique copies of confidential documents with the names of recipients encoded, recipients are deterred from leaking the document, for example by photocopying, because they fear that the leaked copy will be found and traced back to them. The marking is repeated throughout the text, so that it can be decoded even if only a small fragment of the document is recovered.

AN EXAMPLE OF A TABLE

|            | March  | April  | May    | June   |
|------------|--------|--------|--------|--------|
| Beans      | 1,2800 | 2,580  | 16,291 | 44     |
| Potatoes   | 110    | 2,210  | 65     | 21,180 |
| Apples     | 2,990  | 1,660  | 995    | 1,660  |
| Almonds    | 2,850  | 2,780  | 2,100  | 1,990  |
| Grapefruit | 7,520  | 880    | 1,280  | 5,600  |
| Mandarins  | 20,228 | 20,448 | 20,919 | 20,010 |
| Mangos     | 1,110  | 1,200  | 962    | 988    |
| Cabbages   | 18,420 | 18,660 | 18,611 | 16,710 |
| Lettuce    | 66     | 94     | 180    | 122    |
| Squash     | 18,435 | 14,991 | 18,000 | 17,200 |

Fig. 4

```
' Scan line building array of space sizes and total space
' Spacearray(n) is an array of spaces in the line
for i=1 to number_of_spaces
   spacearray(i)=current_space
   total_space=total_space+current_space
next i ' Modulate spaces in line
' Modarray(n) is an array of long or short space
' indicators L or S
' Factor is the modulation factor
for i=1 to number_of_spaces
   if modarray(i)="S" then
   spacearray(i)=spacearray(i)-spacearray(i)*(1-factor)
   endif
   if modarray(i)="L" then
   spacearray(i)=spacearray(i)+spacearray(i)*(1+factor)
   endif
new_total_space=new_total_space+spacearray(i)
next i ' Calculate change of total space
change=new_total_space - total_space ' Adjust spaces to return original line length
for i=1 to number_of_spaces
  spacearray(i)=spacearray(i) + change / number_of_spaces
next i
```

Fig. 7

DOCUMENT MARKING SYSTEM EMPLOYING CONTEXT-SENSITIVE EMBEDDED MARKING CODES

This application is a continuation-in-part of Ser. No. 07/548,904 filed on 24th Jul., 1990.

TECHNICAL FIELD

The present invention relates to methods of, and apparatus for, generating documents which, as well as presenting the usual alphanumeric text information, contain a distinctive marking. More particularly, the marking scheme of the invention can convey identifying information which, in the event of a document coming into the possession of an unauthorized person, allows a particular copy of a document to be traced to its source.

BACKGROUND ART

A common problem faced by authors of confidential documents is the difficulty of preventing unauthorized persons from gaining access to them. A related problem is breach of copyright of printed texts. These problems have become particularly acute with the commonplace availability of photocopiers as it is a simple matter for a person legitimately possessing a certain document to copy it and pass it on to other, perhaps unauthorized, persons. To date, prevention of such transgressions has been mainly by physical restriction of availability, for example by denying access to all but a trustworthy few, and relying on punitive measures to prevent breach of confidence. As a further deterrent confidential documents are sometimes stamped with the words "SECRET" or "CONFIDENTIAL". Such techniques have little effect and efforts have been made to mark documents in such a way that each copy bears a distinctive feature so that in the event of "leaking" the source of the leak can be identified. One such technique involves subtly changing the text of each copy distributed, for example by introducing spelling mistakes, and recording the details of changes made in the case of each recipient. This technique is cumbersome, requires undesirable alteration of the text, and relies on recovery of the whole or a large part of the text to be effective as a means of identifying the source. Other marking schemes utilize a pattern of special markings which must cover the whole page area if the possibility of erasure is to be avoided. Some document marking schemes rely on subtle variations of character formation, for example by changing the typeface of selected characters. One such system, described in Patent Cooperation treaty International Publication WO 85/05713 of Millet, used small variations in the formation of characters produced by a dot-matrix printer to uniquely mark documents. For example, Millet's system can selectively omit dots of the usual matrix to create deliberately mis-formed characters. This scheme is only effective in a limited range of applications, since the subtle variations are easily lost if the document is blurred by photocopying, particularly if multiple generations of copies are made.

An improved document marking scheme has been published under the Patent Cooperation treaty International Publication number WO 89/07819 of Vogel. This publication discloses a scheme which marks documents by varying the spacing between words. According to this scheme the pattern of space variations conveys marking information which is unique to each copy of a document printed and can be used to trace the source of a particular copy in the case of a leak.

Although the scheme of WO 89/07819 is very useful, the improved marking scheme of the present invention is responsive to the content of a document so that the system of marking is optimized according to the format of the text. For example, where text is in tabular format, spacing between lines is varied for marking rather than spacing between words, thereby maintaining columnar alignment.

One shortcoming of prior-art document marking schemes is that they do not solve the problem of marking unmarked documents copied using a photocopier. For example, there is a strong need for a system which will deter people from copying books in libraries, an act which could infringe copyright.

The present invention is directed to providing an improved document marking scheme which uniquely identifies each of a potentially large number of copies of a document. A further novel and useful feature of the invention is the ability to convey within the marking textual information, such as the name of the intended recipient of each copy. The invention can also be used to encode long passages of text within a document in a way that is not readily visible but can be decoded to reveal the original encoded text. Furthermore the marking scheme of the invention does not significantly detract from the visual quality of the document, and the marking is maintained in spite of photocopying, enlarging or reducing. Another feature of the present invention is that it can be effectively used to mark text of a wide variety of formats, including tabular text.

The invention can also be practiced in the form of a photocopier which uniquely marks copies produced, so that, for example, if a person copies a book in a library, the name of the person making the copy is marked into the copy made. The invention can be realized by a suitable arrangement of conventional digital data processing components. Other advantages and objects of this invention will be more fully appreciated from the description of the invention which follows.

SUMMARY OF THE INVENTION

According to one aspect of the invention, an improved document marking method comprising the steps of inputting a document, inputting a marking code to be applied to the document, and altering the spacing between groups of text elements according to a transformation of the marking code is provided. The document and the marking code can be input by scanning a printed document, or by entries from a keyboard, or by receiving data representative of a document in electronic form. The invention is further adapted so that the classes of text elements between which the spacing is varied is selected according to which type of variation is most applicable to the format of text appearing at the particular point in the document to which the marking is being applied. The type of variation being used for marking can be controlled by directives within the document or it can be selected automatically according to the format of text in the document. For example, the invention can be arranged so that spacing between words is used to convey the marking except where columns of text appear in the document, in which case spacing between characters or spacing between lines is used, so that the columnar alignment of text is not adversely affected.

According to another aspect of the invention the marking code is generated automatically and the step of entering a marking code is not required. In this case, the marking code can be generated as an ascending number sequence, a pseudo-random number sequence, or other function. Alternatively, the marking code can be automatically derived from information stored within the data processor, including data representing the user's name, user's password, date, time or document name.

According to yet another aspect of the invention there is provided a method of generating multiple uniquely-marked documents, employing the steps of the previous paragraphs repeatedly, using different identifying data each time.

The invention also provides a method of decoding the marking encoded into a document using the above methods, comprising the steps of examining the spacing between printed elements of a document, classifying said spaces as large or small, and matching the resulting sequence of large and small spaces with predetermined sequences. Such predetermined sequences can include sequences representing alphanumeric characters, a sequence number, or a pseudo-random sequence.

According to a further aspect of the invention there is provided improved document marking means comprising means for inputting a document and a marking code to be applied to the document, and space-altering means for altering the spacing between groups of text elements according to a transform of the marking code. The space-altering means is adapted so that the classes of text elements between which the spacing is varied is selected according to which type of variation is most applicable to the format of the text appearing at the particular point in the document to which the marking is being applied.

According to another aspect of the invention, further means are provided for automatically generating the marking code and means for entering a marking code are not required. In this case, the marking code can be generated as an ascending number sequence, a pseudo-random number sequence, or other function. Alternatively, means are provided for deriving the marking code automatically from information stored within the data processor, including data representing the user's name, user's password, date, time or document name.

According to yet another aspect of the invention there is provided means for generating multiple uniquely-marked documents, employing the document marking methods of the invention repeatedly, using different marking data each time.

Another useful extension of the invention provides a photocopier which performs a marking function, comprising document scanner means, marking code input means, processing means for grouping text elements of the scanned document into classes and marking the document by varying the spacing between text elements according to the marking code, and means for printing the marked document. The photocopier can further comprise locking means adapted to enable copying only if a marking code has been entered. The locking means can be further adapted to accept only marking codes which pass a predetermined test for validity.

The invention also provides a system for decoding the marking encoded into a document using the above methods, comprising means for examining the spacing between printed elements of a document, classifying said spaces as large or small, and matching the resulting sequence of large and small spaces with predetermined sequences.

BRIEF DESCRIPTION OF THE DRAWINGS

The foregoing and other objects, features, extensions, and advantages of the invention will be apparent from the following description of some exemplary embodiments of the invention, as illustrated in the accompanying drawings in which:

FIG. 2 is an illustration of an original piece of text, including a paragraph of text and a table, before marking;

FIG. 3 is an illustration of the text of FIG. 2 after marking using inter-word spacing and inter-line spacing;

FIG. 4 is an illustration of the text of FIG. 2 after marking using inter-word spacing and inter-character spacing;

FIG. 7 is a program listing of a routine for modifying inter-word spacings without changing line length;

DESCRIPTION OF PREFERRED EMBODIMENTS

Figure 1:
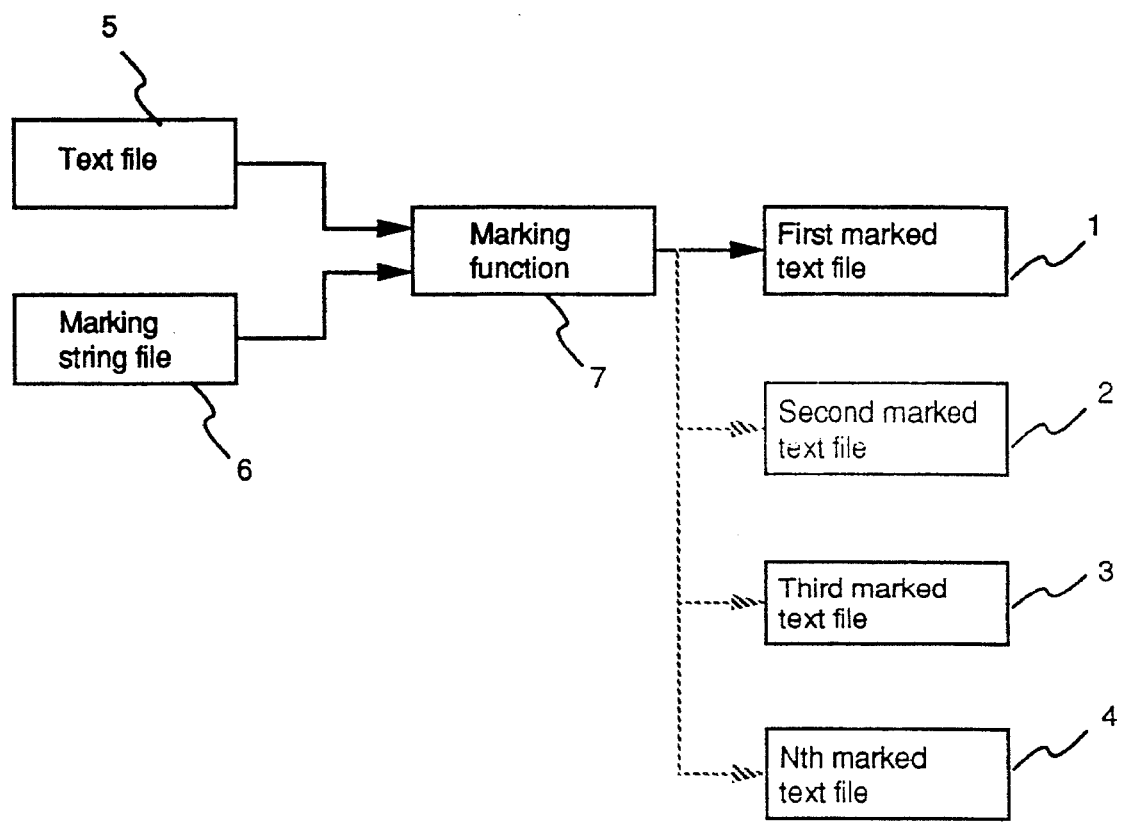
FIG. 1 is a schematic representation of a multiple document generating scheme according to the invention.

A text processing system for carrying out the invention will now be described, by way of example only, in which a programmed digital computer is used to perform word-processing functions as well as the document marking function of the invention. This embodiment is useful for producing multiple copies of a document, each carrying a distinctive marking within the format of the text. For convenience, in this embodiment the marking codes correspond to alpha-numeric strings, such as persons' names, although this is not an essential characteristic of the invention. Referring to FIG. 1, a schematic representation of this multiple-document production scheme is shown. Text file 5 is a digital representation of the document to be marked. Marking string file 6 is a set of data representing a table of alphanumeric strings, each designating a recipient of the document. These files can reside in the memory of the computer or on a storage medium or can be received serially from another source and are created using well-known text-entry techniques, typically by typing on a keyboard. Marking function 7 is a set of program instructions which when executed by the computer, causes the data of the text file to be altered so that when printed, the spacing between characters, words, lines or other class of similar text elements is increased or decreased according to the marking algorithms.

Within marking function 7 are routines which perform a transformation upon the marking strings, that is, the strings are input character by character and for each character a unique series of "longs" and "shorts" is generated. In this embodiment the transformation is a simple lookup of a 10-bit code, although in other embodiments more complex transformations are performed. For example, an encryption key can be included as a term in applications requiring security of marking.

This embodiment of the invention produces a number of copies of a document, each uniquely marked according to the contents of a marking string file. By way of example, the marking string file can contain a number of records, each of which is the name of an intended recipient of a document. In this example, if there are ten recipients, the arrangement of FIG. 1 will produce a first marked file 1 from text file 5 using the first record of marking string file 6, then a second marked file 2 from text file 5 using the second record of marking string file 6, and so on for each of the ten records. Assuming each recipient's name is different, the result is ten uniquely-marked documents.

It is of course possible to direct the output of marking function 7 directly to a printer, so that the marked text files are not required, or the files can be stored temporarily prior to printing, or permanently on disk or other medium.

Marking function 7 in this embodiment of the invention uses a 10 bit marking code, where each bit defines the length of a corresponding space in the marked document. The codes corresponding to each alphanumeric character have been selected to minimize the occurrence of long series of long or short spaces, so that the undesirable degradation of the appearance of the marked document is minimized.

The marking code corresponding to each character is shown in the following table (table 1), in which S represents a Short space, L represents a Long space.

TABLE 1

TABLE OF CHARACTER CODES

| SLSLSLSLSL | A | SSSLSLSLSL | 0 |
| SLSLSLSLLS | B | SSSLSLSLLS | 1 |
| SLSLSLLSSL | C | SSSLSLLSSL | 2 |
| SLSLSLLSLS | D | SSSLSLLSLS | 3 |
| SLSLLSSLSL | E | SSSLLSSLSL | 4 |
| SLSLLSSLLS | F | SSSUSSLLS | 5 |
| SLSLLSLSSL | G | SSSLLSLSSL | 6 |
| SLSLLSLSLS | H | SSSLLSLSLS | 7 |
| SLLSSLSLSL | I | LLLSSLSLSL | 8 |
| SLLSSLSLLS | J | LLLSSLSLLS | 9 |
| SLLSSLLSSL | K | LLLSSLLSSL | # |
| SLLSSLLSLS | L | LLLSLSLSLS | SPACE |
| SLLSLSSLSL | M | | |
| SLLSLSSLLS | N | | |
| SLLSLSLSSL | O | | |
| SLLSLSLSLS | P | | |
| LSSLSLSLSL | Q | | |
| LSSLSLSLLS | R | | |
| LSSLSLLSSL | S | | |
| LSSLSLLSLS | T | | |
| LSSLLSSLSL | U | | |
| LSSLLSSLLS | V | | |
| LSSLLSLSSL | W | | |
| LSSLLSLSLS | X | | |
| LSLSSLSLSL | Y | | |
| LSLSSLSLLS | Z | | |
| LSLSSLLSSL | * | | |
| LSLSSLLSLS | + | | |
| LSLSLSSLSL | , | | |
| LSLSLSSLLS | - | | |
| LSLSLSLSSL | . | | |
| LSLSLSLSLS | / | | |

As can be seen from table 1, the marking codes for most characters have been chosen to ensure a maximum of two consecutive long or short spaces, except that the characters 0–9, # and space begin with three long spaces or three short spaces. This scheme allows the beginning of the characters starting with three long spaces or three short spaces to be located unambiguously even if the starting position of the coding is not known, for example, when only a fragment of the document has been recovered. For this reason it is desirable that marking strings include at least one space or numeric character.

The marking can be applied by means of varying the spaces between words, characters or lines of text, according to the nature of the document. For example, for plain text in the usual paragraph form, varying spacing between words is generally the most visually acceptable means of marking. However, where text takes the form of tabulated columns, such variations can spoil the appearance of the text, and in such circumstances it may be desired to use variation of another class of text elements, such as inter-character spacing or inter-line spacing. The selection of which type of space variations are used can be made responsive to the content of the surrounding document. For example, inter-line space variation can be selected automatically if the line of text being marked contains tabulation characters or if the positioning of words on the page is determined to be characteristic of tabular text. Alternatively, selection of class of text elements to which spacing variations are applied can be controlled by directives embedded in the document.

When varying inter-word spacing, this embodiment of the invention is arranged so that spaces following punctuation are ignored by the marking function, in order to avoid ambiguity arising from multiple spaces commonly used after punctuation.

By way of illustration, FIGS. 3 and 4 show the appearance of the different types of marking provided by this invention when applied to the sample document shown in FIG. 2. As seen in FIG. 2, the sample document comprises a paragraph of text followed by a table. This document is typical of that produced by a conventional word-processor, where the spacing between characters, words and lines is constant.

As seen in FIG. 3, the document has been marked using the invention. The paragraph of text has been marked by varying the inter-word spacing, and the table has been marked by varying the inter-line spacing. As seen in FIG. 4, the paragraph of text has been marked by varying the inter-word spacing, and the table has been marked by varying the inter-character spacing.

Operation of this embodiment of the invention will now be further explained with reference to a number of flow diagrams, in which the following abbreviations are used:

| | |
|---|---|
| I.F. | Input file |
| M.S.F. | Marking string file |
| E.O.R. | End of record |
| CHAR | Current character |
| PREV | Previous character |
| E.O.T. | End of text |
| PATTERN | 10 bit marking code pattern |
| BIT COUNT | Number of bits of PATTERN remaining to be used |
| DEC | Decrement |
| M.S.B. | Most significant bit |
| L.F. | Line feed character |

Figure 5:
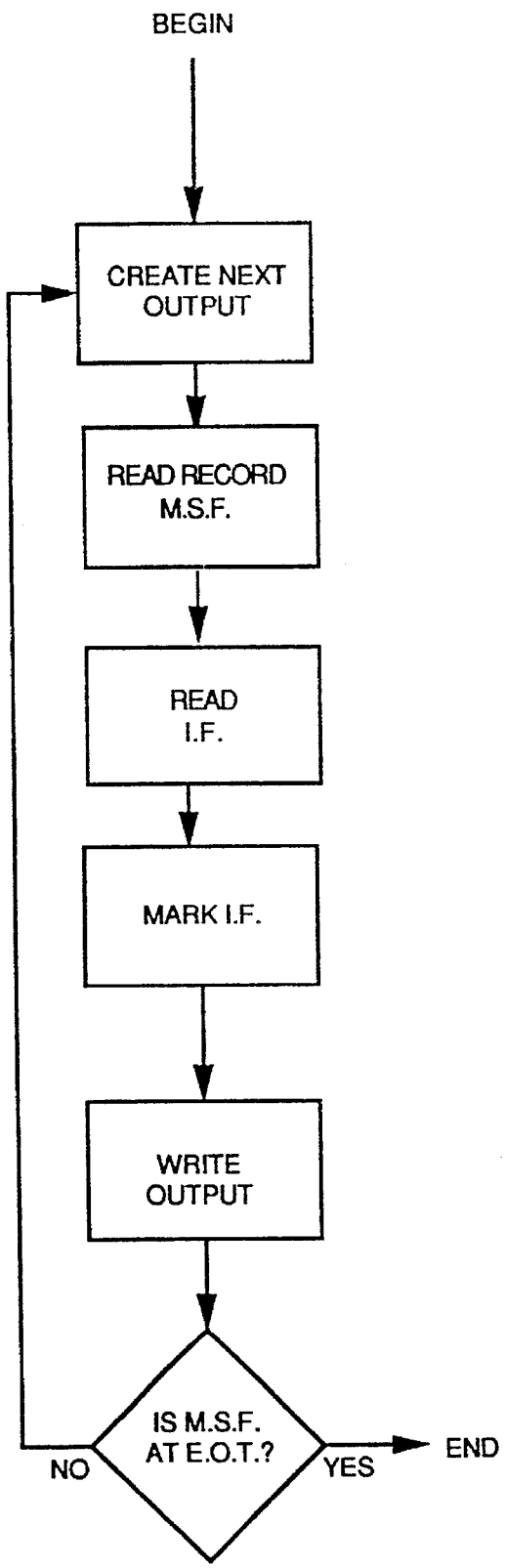
FIG. 5 is a flow diagram of a generalized system used for creating multiple uniquely-marked copies of a document.

Referring to FIG. 5, the process begins with the creation of the first output file. The first record of the marking string file (M.S.F.) is then read. Each record of the M.S.F. corresponds to one string that is to be marked into each copy of the document output, that is, the number of records in the M.S.F. determines the number of marked copies that will be generated. The input file (I.F.) is then read, marked with the current marking string, and output as a marked file. This process is repeated until the M.S.F. reached end of file (E.O.F.).

Within the process shown as "Mark I.F." are a number of sub-processes arranged to vary the type of marking applied to the document according to user instructions or according to the format of the text being marked. For example, in one preferred embodiment, variation of spacing between words, characters or lines of text can be used to convey the marking, the most appropriate method being controlled by directives placed within the text. Examples of such directives are:

| | |
|---|---|
| <<on>> | turn marking on |
| <<off>> | turn marking off |
| <<char>> | use inter-character spacing for marking |
| <<word>> | use inter-word spacing for marking |
| <<line>> | use inter-line spacing for marking |

These directives are not written to the output file, but instead are used as directives to the marking routines to switch to the requested mode from the point at which the directive occurs in the text.

Details of the various marking processes of this embodiment will now be given with reference to FIGS. 6–9.

Figure 6:
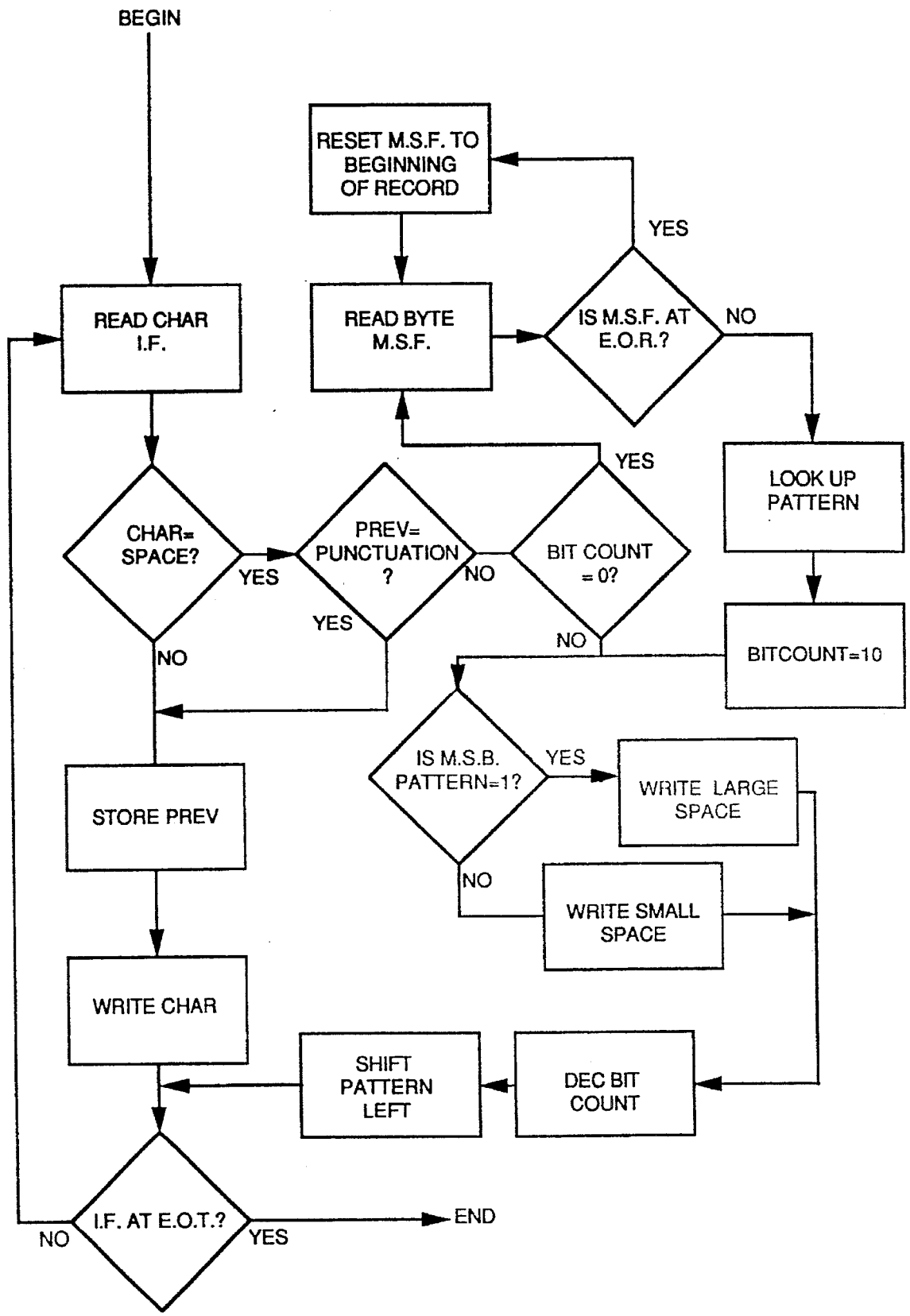
FIG. 6 is a flow diagram of a routine suitable for the input file marking function of the flow diagram of FIG. 5 in the case of inter-word space marking.

The flow diagram of FIG. 6 corresponds to the marking process which varies the inter-word spacing of the text. The M.S.F contains a number of records each of which corresponds to a text string to be marked into a copy of the document. Each ASCII character of the marking strings corresponds to a 10 bit marking pattern, as described above.

The marking process is performed on a character-by-character basis. As each character is read from the input file, a test performed to determine whether the character read (CHAR) is the space character. If not, CHAR is stored in a temporary location PREV, CHAR is written to the output file, and a test is performed to see if the input file is at end of text. If not, the next character is read from the input file, and this process is repeated until a space character is encountered. When a space is encountered, PREV is tested to see whether the previous character was a punctuation character. If it was, the space is ignored. If not, a test is performed to see if BIT COUNT has reached zero, indicating that the end of the 10 bit marking pattern has been reached. If not, the most significant bit of PATTERN is then tested. If it is set (=1) a large space is written to the output, if it is clear (=0) a short space is written to the output.

The BIT COUNT is then decremented and the PATFERN shifted one bit to the left, in preparation for the next iteration. If, on encountering a space in the input file, the test BIT COUNT=0 is true, the next byte of the marking string file is read. If the marking string file is at the end of a record, the file is reset to the beginning of the same record, so that the marking string will be repeated throughout the pass of the input file. If it is not at the end of the record, the byte read from the marking string file is used to obtain a 10 bit marking pattern using a lookup table containing the data of Table 1, and BITCOUNT is reset to 10.

When the test "I.F. AT E.O.T.?" returns true, the M.S.F. is set to the beginning of the next record, so that the next marking string will be used to mark the next file generated. A test is then performed to see if the M.S.F. is at E.O.T. A true result indicates that all required marked copies have been generated, in which case the process ends. If M.S.F. is not at E.O.T., another output is created, and the process repeats, generating an output file with the markings dictated by the next marking string of the M.S.F.

In this embodiment, the inter-word space modifying routine is arranged so that the overall line length is not changed by the marking function. This is particularly important in the case of right-justified text, where it is desirable to maintain a straight fight margin. The system by which this is achieved will now be described with reference to FIG. 7, which is a program listing in the BASIC language.

This routine is called once a line of text has been processed by the marking scheme described above, which has nominated long or short spaces for each of the inter-word spaces in the line and built an array (modarray) of space-size indicators, in this example "L" for long or "S" for short. The routine of FIG. 7 first builds an array of space sizes (spacearray) which contains the size of each space in the line of the input file (current_space) and calculates the total size of space in the line (total_space) by summing each element of spacearray. Next the modulation of spaces is performed by increasing the size of spaces where the corresponding element of modarray is "L" and decreasing the size of spaces where the corresponding element of modarray is "S". The amount of change introduced is determined by the constant "factor", which in this embodiment can be selected by the user depending on the required degree of modulation of spaces. Values for "factor" can range from 0, which results in no modulation, to 1, which results in words touching each other where the space between them is "short". Using this embodiment, a factor of 0.3 has been found to yield good results.

The process described so far will in most cases change the total line length, and it is necessary to further adjust the spaces to return the total amount of space, and hence the line length, to the original value. This is achieved by the last two steps of FIG. 7. First, the change of line length is calculated by subtracting the original total space size from the new total space size. This error is then divided by the number of spaces in the line and the result added to each space, so that the correction is distributed evenly throughout the spaces of the line.

This space-modulating process is applicable to text processing systems which allow spaces between words to be finely controlled, for example using a page description language. In other cases, such as where only fixed-size spaces are available, the long space can be generated by using two consecutive space characters.

Figure 8:
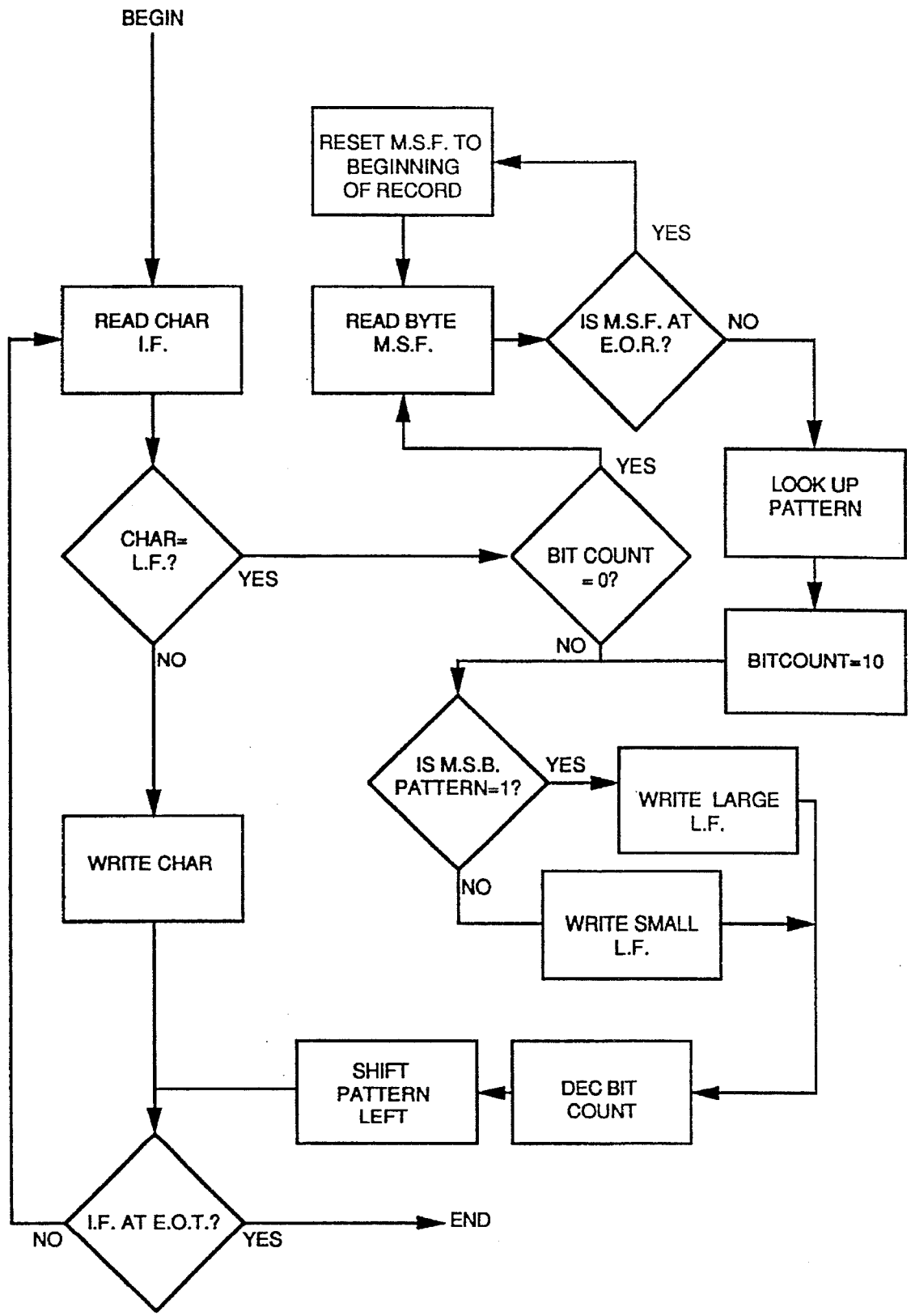
FIG. 8 is a flow diagram of a routine suitable for the input file marking function of the flow diagram of FIG. 5 in the case of inter-line space marking.

When it is desired to mark the document by varying inter-line spacing, the scheme shown diagrammatically in FIG. 8 is used. The process described in FIG. 8 is similar to that described above in relation to FIG. 6, except that the detection of line feed characters is used to invoke the marking routines, instead of space characters. Also, it is not necessary in this case to test whether the character prior to the line feed was a punctuation character. Modulation that does not effect the overall page length can be achieved in a method similar to that described above in relation to inter-word space modulation.

Figure 9:
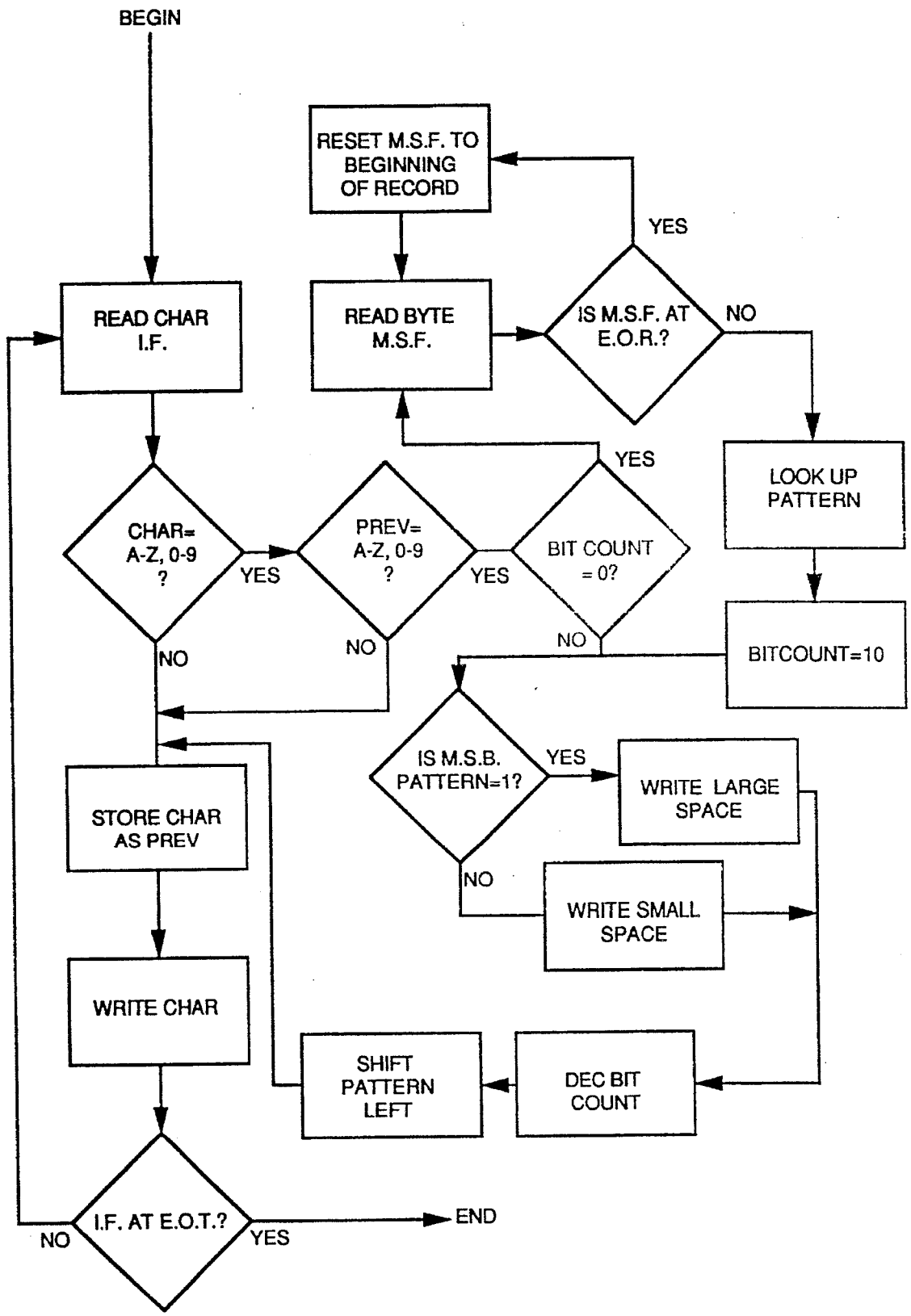
FIG. 9 is a flow diagram of a routine suitable for the input file marking function of the flow diagram of FIG. 5 in the case of inter-character space marking.

When it is desired to mark the document by varying inter-character spacing, the scheme shown diagrammatically in FIG. 9 is used. The process described in FIG. 9 is similar to that described above in relation to FIG. 6, except that detection space modulation is performed after every alpha-numeric character (A-Z, 0–9). Modulation that does not effect the overall page length can be achieved in a method similar to that described above in relation to inter-word space modulation.

In some embodiments of the invention, certain additional features are provided for the purpose of streamlining the production of multiple marked documents. One such feature is additional software which provides the ability to command the computer to automatically use a recipient list (marking string file of the above-described embodiment) as a source of names to be inserted into a prescribed merge field of a document. This is useful for automatically annotating each marked copy with an identifying message. For example, it may be desired to print the message "THIS DOCUMENT IS MARKED AND UNIQUE TO J. SMITH" at the head of each version. In this case, the name (J. SMITH) would take the form of a merge field in the original document, the name being automatically inserted in the output text as part of the marking process of the invention.

Another useful extension of the invention is its application to word-processing systems in which a plurality of users may have access to a document. One example of such an application is a multi-terminal word-processing system incorporating electronic mail facilities whereby a document can be circulated to a number of people in electronic form, that is, without printing on paper. Another example is a computer to which a number of users have access. In these and other cases, the invention can be used to deter those with access to the document from printing a copy and disclosing it to unauthorized persons. To achieve this, the invention can be adapted so that text files used by the word-processing system carry within them an indicator that the document which they represent is to be marked when printed, this indicator being accessible only to the author of the document. The printing software of the data processing system is arranged so that if any person instructs that the document be printed, the document will be marked, for example with the name of the person requesting the print. The name can, for convenience, be automatically retrieved from a file containing a correspondence between the password of a user of the system and that user's name. Alternatively, the marking can be determined by a marking string designated by the original author of the document at the time it is electronically mailed to each person, the string and the indicator that the document is to be marked when printed being linked to the file when mailed.

Figure 10:
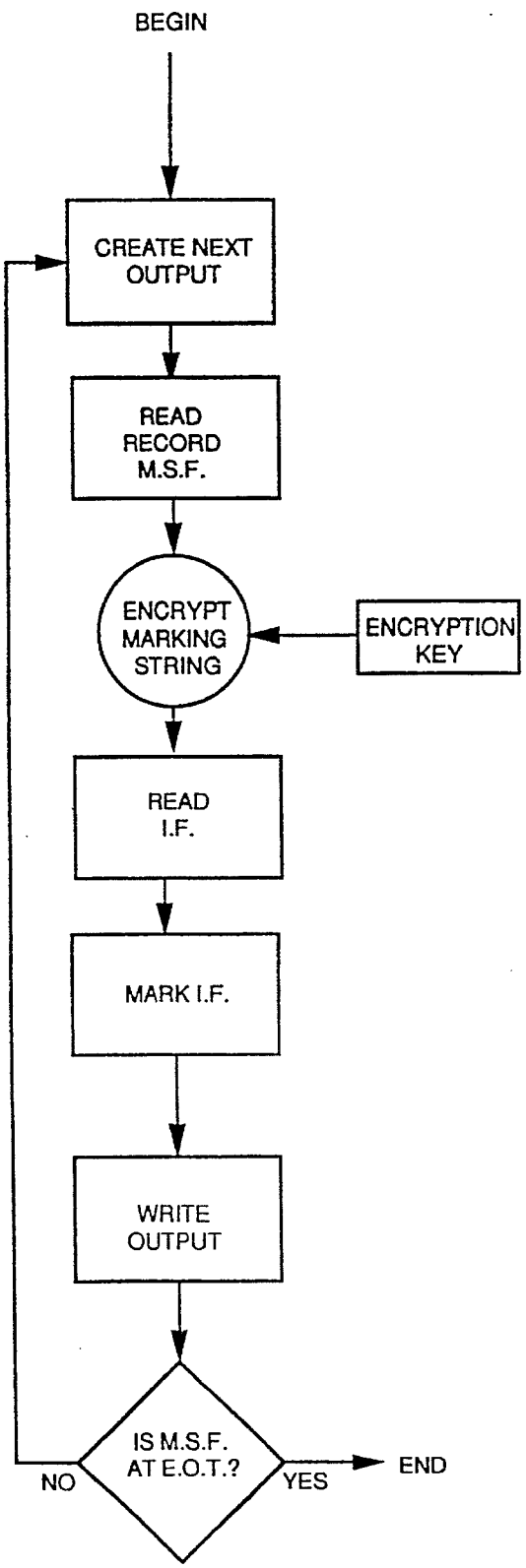
FIG. 10 is a flow diagram of document marking system utilizing encryption of the marking string.

Although the effectiveness of the present invention is generally not diminished by the ease with which anyone can detect and decode the marking of a document it has generated, it is desirable in some cases to prevent unauthorized persons decoding a marking. In some cases it may also be desirable to prevent unauthorized persons from making a marked document with a marking identical to that of another. For example, it is possible that a person possessing the present invention could generate a document marked with someone else's name and then use that copy improperly, with the result that the person whose name was used would be blamed. To overcome these potential abuses, the invention can be further extended to encrypt the marking using an encryption key known only to the authorized user. This modification is shown diagrammatically in FIG. 10. This flow diagram shows the basic document marking scheme, as described in relation to FIG. 5 above, and includes the further step of encrypting each record of the marking string file prior to applying the marking to the document. The encryption system can be any of the schemes well known in the art. The encryption key is known only by the authorized user, and must be applied to the decoded spacing variation data to recover the correct marking information from a marked document. It will be understood that this scheme of encrypting is only one of many that will achieve the desired result. For example the encryption could also be applied with good results to the "look up pattern" step of FIG. 6.

Figure 11:
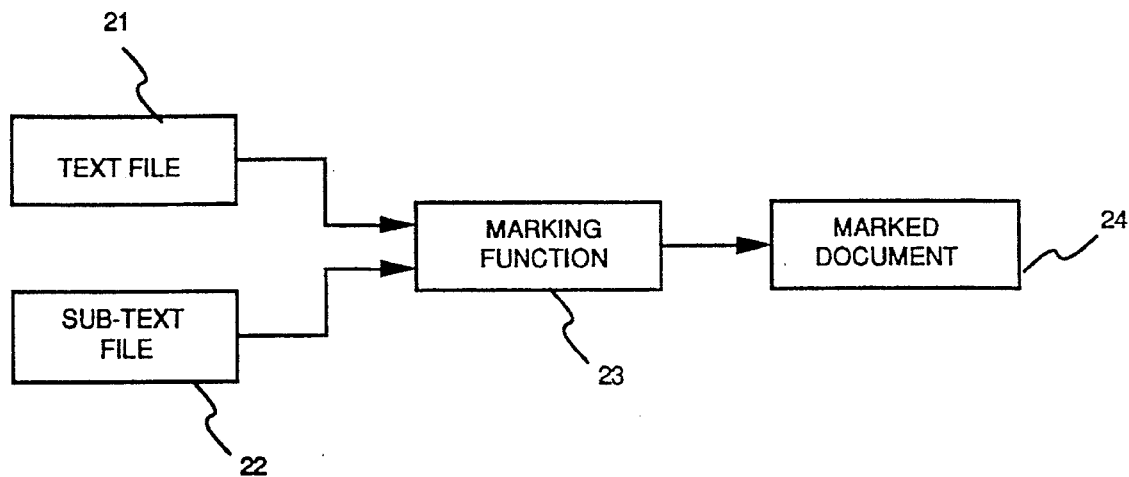
FIG. 11 is a schematic illustration of an embodiment of the invention adapted to encode a sub-text into the marking of a document.

In another embodiment of the invention, the basic marking scheme of the invention is used to encode a sub-text of arbitrary length within the spaces between words of a document. Such an embodiment is shown schematically in FIG. 11. Referring to FIG. 11, a marking function 23, as described in the context of the embodiment above, is applied to a text file 21 to produce a marked document 24, except that in this case the marking corresponds to the characters of sub-text file 22. Sub-text file 22 contains a message of arbitrary length which is encoded into the marked document, instead of individual short strings used in the marking string file 6 of FIG. 1. Using this or similar embodiments, the invention can be used to convey information within the spaces between words, at a density of approximately one character per ten words.

Figure 12:
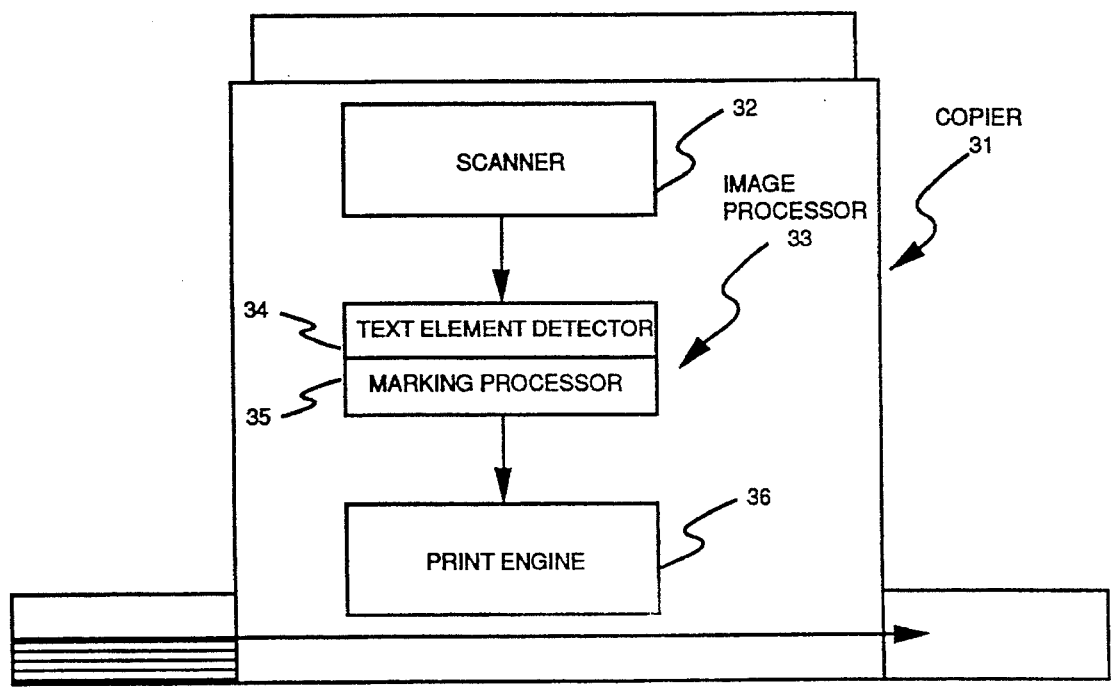
FIG. 12 is a schematic illustration of an embodiment of the invention adapted to mark documents as part of a photocopying process.

Although the invention is very useful when realized as a word-processing system, it is also envisaged that the inventive concept can be adapted for use with other document processing or document reproducing devices. For example, in many cases it is desirable to provide a system for marking documents which have already been printed as hard copy. Another useful embodiment of the invention which achieves this object will now be described with reference to FIG. 12, which shows in schematic form a photocopier adapted to perform document marking according to the invention. Referring now to FIG. 12, copier 31 is a document copying machine of the type now commonly referred to as a "digital copier". Digital copiers commonly comprise electro-optical scanning means coupled to an electronically controlled print engine, using a scanning laser, light-emitting diode array or liquid crystal array to form an image on a drum which is then transferred to paper. In this embodiment of the present invention, as well as comprising scanner 32 and print engine 36, copier 31 is equipped with image processor 33 which in turn comprises text element detector 34 and marking processor 35. When a marked copy of a document is to be made, the image data output by scanner 32, which usually feeds print engine 35, is routed instead through image processor 33. Within image processor 33, the image data is first acted on by text element detector 34, which is arranged to group objects on the scanned page into elements such as characters, words and lines. There are many techniques for achieving this, well known to the optical character recognition art. For best results, a scheme which works irrespective of orientation of the document relative to the scanner is used. Once the elements of interest have been identified, a marking process is performed by marking processor 35, according to the methods of the present invention. For example, if inter-word spacing modulation has been selected as the marking method for a particular document, text element detector 34 is arranged to group elements into words and marking processor 35 then moves the words slightly relative to each other in the plane of the lines of text to achieve the lengthened and shortened spaces required. The choice of class of text elements to which space variation will be applied can be effected manually by an operator or software which determines the most suitable form of marking according to the format of the document being copied can be provided within image processor 33. When marking is complete, the image data is transmitted from image processor 33 to print engine 36, and the image is printed on paper. To aid in identifying a particular copy, the marking text can also be printed in a convenient position on the document, for example, at the foot of each page.

The marking string used by this embodiment of the invention can be input in a number of ways. For example, the operator can key in a text string or serial number using a keyboard, or load in list of recipients, to be used as marking strings, from a floppy disk. Another useful variant is to provide further processing means within the copier of this embodiment so that a list of recipients can be entered for use by marking processor 35 by scanning a printed list on the copier. In this case optical character recognition software within image processor 33 reads the recipient list off the document in bitmapped image form, converts the image to text, and uses this text as the marking strings.

One adaptation of this embodiment of the invention is directed at the problem of preventing breach of copyright in places such as libraries, where people have access to books although it is common to provide photocopier facilities for uses which constitute fair use, it is desirable to curtail use of the photocopier in ways which would breach copyright. For such applications, the present invention is provided with an electronic locking system that allows the copier to operate only after a code number or word is entered by the user. The information entered is then used as the marking string, according to the scheme described above. One way of entering the code is to use a coded card, such as a magnetic-stripe credit card, which carries identification unique to the cardholder. Alternatively, the locking system can be adapted so that codes must conform with certain requirements to be accepted as valid, such valid codes being issued by an authorized person at the library and keyed in by the user or remotely entered by the authorized person. For example, the generation of valid codes can be accomplished by an algorithm which combines the user's name with an encryption key and produces a large but finite set of valid outputs, so that the copier's controller can detect entered codes which have not been legitimately generated.

In another useful variant of the embodiment of FIG. 12, image processor 33 is further adapted to apply pseudo-random variations in spacing between elements of text so that each copy produced is distinctively marked. The pseudo-random algorithm is arranged so that aesthetic constraints are not violated, for example, total line lengths are maintained and tables or columns are not unduly disturbed. This embodiment has an advantage in circumstances it is not desirable or practical to enter a recipient list into the device. In this case, to enable documents to be traced to their source, the system can be arranged to generate two identical copies of each pseudo-randomly marked copy. When the documents are distributed, the name of each recipient is written on the duplicate and the duplicates are filed in case it is later necessary to match them up to a particular marked version.

Alternatively, the invention can be adapted to mark copies with a unique serial number, the number being generated automatically and output so that a record of to whom a copy with a given serial number was given can be kept.

As well as application to photocopiers, the present invention is of great value when applied to other document processing or reproducing systems, including facsimile machines.

In many cases, the benefits of the marking scheme extend beyond the ability to monitor distribution of confidential or copyright documents. For example, when used with facsimile transmissions, the marking can be used to authenticate documents. In this case, encrypted marking can be used for extra security.

Irrespective of the embodiment of the present invention used to mark the document, there are a number of schemes which can be used to decode the marking of a particular document.

In the simplest case, the marking can be decoded manually, by observing the pattern of long and short spaces in the document and looking up the corresponding character codes as per Table 1. The process can be partially automated by providing a means for decoding the marking information from spacing information determined visually and input into a processing device programmed to perform the inverse of the marking process.

Alternatively, the source of a marked document can be identified by optically comparing the document with a set of copies made prior to circulating the document and identifying the one which matches. For identification, the copies should be labelled with the name of the recipient. For better security, it may be desired not to keep copies of the circulated documents, but to generate a new marked set for comparison purposes should the need for identification arise. Visual comparison can be aided by producing a transparency of the document which can be used to overlay the copy to be compared.

If desired, the decoding process can be automated, using a document scanner to input the document to be decoded to a computer which can then decode the marking, by ascertaining the spacing between words, characters or lines as appropriate. The embodiment of FIG. 12 can readily be adapted for decoding markings, thereby providing a photocopier which outputs a page printed with the text of the decoded marking when presented with a page of a marked document.

RAMIFICATIONS AND SCOPE

This invention provides a useful and novel system for curtailing unauthorized distribution of documents, identifying individual ones of multiple copies of a document, authenticating documents, deterring breach of copyright of documents, and many other applications. The system is simple to use and can be conveniently and inexpensively combined with other document production equipment such as word-processors, data-processing systems and photocopiers.

It can also be used to convey a secondary message within a potentially unrelated text.

Further advantages are the ability to directly convey, within the document, the name of a person to whom a document has been entrusted, the name of a person making a photocopy, or the name of a person instructing a computer to produce hard-copy of a document.

The marking scheme is very versatile and robust. Being distributed throughout the document it is practically impossible to remove the marking without re-keying the entire text. Unlike prior-art marking schemes which rely on changes of character formation or other subtle idiosyncrasies, the marking provided by this invention is conveyed intact in spite of blurring, reductions, facsimile transmission, or other forms of image degradation.

Using prior-art marking schemes, it has generally been necessary to impart obvious markings on the subject document, lest the marking be lost by such degradation. The invention achieves all the above objectives with minimal disturbance to the appearance of the document.

While the invention has been described with reference to particular embodiments thereof, it will be understood by those skilled in the art that changes in the form and detail may be made without departing from the scope and spirit of the invention.

The marking process of the invention is independent of the nature of the document originating means and document printing means and it is anticipated that the invention can be realized in many ways other than those specifically mentioned herein. In particular, the invention can be realized as an integral part of a word-processing system, by adding suitable software to the word-processing software, or it can be realized as a stand-alone device interposed between a source of text data, such as a word processor, and a printer, or it can be realized as a printer adapted to carry out marking according to the invention.

It will also be understood that the scheme for relating a given marking code to a given sequence of space variations utilised by the embodiments described above are exemplary only and many other schemes, obvious to those skilled in the art, can be used without departing from the scope of the invention.

It is also envisioned that in cases where it is desired to make it readily apparent that a document has been marked, one or more printed characters can be used instead of or as well as variations of spacing between words. For example, in the case of the embodiment described above in which two consecutive spaces are used to generate a long space, a space followed by an asterisk can be used, yielding a marked document with asterisks distributed in a distinctive pattern throughout. Although this technique significantly affects the appearance of the text, it is nevertheless useful in cases where it is desirable that the marking be highly apparent, easy to decode, and unlikely to be obscured through tampering, blurring or otherwise distorting the image.

It is further envisioned that whereas the embodiments described above utilize marking information provided by an operator, other adaptations of the invention can be provided whereby the marking codes can be automatically generated by the invention, for example, by forming an ascending number sequence, or a sequence of random numbers, thereby assuring that each copy of a document is distinctively marked, without requiring the operator to provide specific marking information. In such cases it is desirable to maintain a set of duplicates of the documents before circulation for identification purposes. Other embodiments are possible in which the marking information is taken from a data field already serving another purpose within the memory of the data processing apparatus. For example the invention can be made to use the time and date information commonly resident in memory as the marking information, with the result that each copy of a marked document generated will be marked with the time and date at which the document was generated. Other fields such as the name of the author of the document, operator's password, or addressee's name can also be used in like manner.

It will also be understood that whereas the exemplary embodiments described herein refer to the marking process taking place immediately prior to printing a document, the invention can also be beneficially applied for marking documents in electronic form, that is, documents in the form of files of data which may or may not be printed to form hard-copy at a later time.

Whereas the invention is described herein in relation to marking documents comprising characters, words and other text objects, the invention can equally well be used to mark documents comprising any indicia, including icons, special symbols, pictures, glyphs and the like.

I claim:

1. A method of document marking comprising the steps of:

inputting a document comprising text elements separated by spaces;

receiving a marking code to be applied to said document, said marking code being selected from one of a plurality of possible marking codes;

performing a transformation to said marking code;

grouping text symbols of the input document into classes of text elements including at least one of characters, words, and lines;

selecting, according to the content of the document, at least one of said classes of text elements as the class to which space variations are to be applied; and varying the spacing between text elements of the selected class according to the result of said transformation of said marking code so that consecutive individual spaces between said text elements of the selected class are of at least two different lengths and said marking code can be determined from the arrangement of said individual spaces.

2. The document marking method of claim 1 wherein said received marking code is input by an operator.

3. A method of document marking comprising the steps of:

inputting a document comprising text elements separated by spaces;

receiving a marking code to be applied to said document;

performing a transformation to said marking code;

grouping text symbols of the input document into classes of text elements including at least one of characters, words, and lines;

selecting, according to the content of the document, at least one of said classes of text elements as the class to which space variations are to be applied; and varying the spacing between text elements of the selected class according to the result of said transformation of said marking code; wherein said marking code comprises data representing text symbols, the step of performing a transformation of said marking code comprises the sub-step of mapping the text symbols of said marking code to a series of binary numbers, and the step of varying the spacing between text symbols of the document comprises the step of for each text element of the document which is of a class to which space variations are to be applied, testing a corresponding bit of said series of binary numbers and, if said bit is of a first logic state, increasing the spacing between the current text element and an adjacent one, and if said bit is of a second logic state, decreasing the spacing between the current text element and an adjacent one.

4. The document marking method of claim 3 wherein the step of inputting a document comprising text symbols separated by spaces comprises the sub-step of receiving a file comprising digital data words, each data word corresponding to a text symbol.

5. The document marking method of claim 3 wherein the step of inputting a document comprising text symbols separated by spaces comprises the sub-step of:

optically scanning a printed document; and forming, in a memory, digital data representative of the scanned image.

6. A method of decoding a document marked with a marking code comprising the steps of:

scanning a marked document;

classifying spaces between text elements as long or short;

forming a series of binary bits according to said classification; and performing a transformation on said series 7. The method of decoding a marked document of claim 6 wherein:

the step of scanning a marked document comprises the step of electro-optically scanning said document to generate a signal representative of the image thereon; and the step of classifying spaces between text elements as long or short comprises the step of processing said signal to measure the displacement of text elements which have been displaced from their normal position by the marking process.

8. The method of decoding a marked document of claim 6 wherein the step of scanning a marked document comprises the step of visually inspecting said document.

9. Document marking system comprising:

means for inputting a document comprising text symbols separated by spaces;

means for receiving a marking code to be applied to said document, said marking code being selected from one of a plurality of possible marking codes;

means for performing a transformation of said marking code;

means for grouping text symbols of the input document into classes of text elements including at least one of characters, words, and lines;

means responsive to the content of the document for selecting at least one of said classes of text elements as the class to which space variations are to be applied; and means for varying the spacing between text elements of the selected class according to the result of said transformation of said marking code so that consecutive individual spaces between said text elements of the selected class are of at least two different lengths and said marking code can be determined from the arrangement of said individual spaces.

10. The document marking system of claim 9 wherein said received marking code is input by an operator.

11. Document marking means comprising:

means for inputting a document comprising text symbols separated by spaces;

means for receiving a marking code to be applied to said document;

means for performing a transformation to said marking code;

means for grouping text symbols of the input document into classes of text elements including at least one of characters, words, and lines;

means responsive to the content of the document for selecting at least one of said classes of text elements as the class to which space variations are to be applied; and means for varying the spacing between text elements of the selected class according to the result of said transformation of said marking code; wherein:

said marking code comprises data representing text symbols;

said means for performing a transformation of said marking code comprises processor means for mapping text symbols of said marking code to a series of binary numbers; and said means for varying the spacing between text symbols of the document comprises spacing processor means for operating so that, for each text element of the document which is of a class to which space variations are to be applied, testing a corresponding bit of said series of binary numbers and, if said bit is of a first logic state, increasing the spacing between the current text element and an adjacent one, and if said bit is of a second logic state, decreasing the spacing between the current text element and an adjacent one.

12. The document marking system of claim 11 wherein means for inputting a document comprising text symbols separated by spaces comprises means for receiving a file comprising digital data words, each data word corresponding to a text symbol.

13. The document marking system of claim 11 wherein means for inputting a document comprising text symbols separated by spaces comprises an optical document scanner.

14. Document marking system comprising:

means for inputting a document comprising text symbols separated by spaces;

means for receiving a marking code to be applied to said document;

means for performing a transformation to said marking code;

means for grouping text symbols of the input document into classes of text elements including at least one of characters, words, and lines;

means responsive to the content of the document for selecting at least one of said classes of text elements as the class to which space variations are to be applied; and means for varying the spacing between text elements of the selected class according to the result of said transformation of said marking code so that consecutive individual spaces between said text element of the selected class are of at least two different lengths and said marking code can be determined from the arrangement of said individual spaces; and marking code originating means for sending marking codes to said marking code receiving means.

15. Marked document decoding system comprising:

means for receiving data representative of a series of long spaces and short spaces between text elements; and means for performing a transformation on said data to form data representative of the marking borne by the marked document.

16. The marked document decoding system claim 15 further comprising:

an electro-optical scanner for generating a first signal representative of the image thereon;

discriminator means for receiving said first signal and forming a second signal of a first type if the size of spaces between text elements is larger than a certain value and of a second type if the size of spaces between text elements is smaller than a certain value; and transmitting said second signal to said means for receiving data representative of a series of long spaces and short spaces between text elements.

17. A method of document marking comprising the steps of:

inputting a document comprising text elements separated by spaces;

receiving a marking code to be applied to said document, said marking code being able to distinguish one of a plurality of documents from one another;

performing a transformation to said marking code;

grouping text symbols of the input document into classes of text elements including at least one of characters, words, and lines;

selecting, according to the content of the document, at least one of said classes of text elements as the class to which space variations are to be applied; and varying the spacing between text elements of the selected class according to the result of said transformation of said marking code so that consecutive individual spaces between said text element of the selected class are of at least two different lengths and said marking code can be determined from the arrangement of said individual spaces.

18. The document marking method of claim 17 wherein said received marking code is input by an operator.

19. Document marking means comprising:

means for inputting a document comprising text symbols separated by spaces;

means for receiving a marking code to be applied to said document, said marking code being able to distinguish one of a plurality of documents from one another;

means for performing a transformation to said marking code;

means for grouping text symbols of the input document into classes of text elements including at least one of characters, words, and lines;

means responsive to the content of the document for selecting at least one of said classes of text elements as the class to which space variations are to be applied; and means for varying the spacing between text elements of the selected class according to the result of said transformation of said marking code so that consecutive individual spaces between said text element of the selected class are of at least two different lengths and said marking code can be determined from the arrangement of said individual spaces.

20. The document marking system of claim 19 wherein said received marking code is input by an operator.

21. The document marking system of claim 19 wherein means for inputting a document comprising text symbols separated by spaces comprises means for receiving a file comprising data words, each data word corresponding to a text symbol.

22. The document marking system of claim 21 wherein said marking code originating means comprises processor means adapted to form a marking code representative of identifying data resident within memory means, said identifying data being selected from the group consisting of a user password, user name, addressee's name, password, date, time or document name.

23. The document marking means of claim 19 wherein system for inputting a document comprising text symbols separated by spaces comprises an optical document scanner.

24. A method of document marking comprising the steps of:

inputting a document comprising text elements separated by spaces;

receiving a marking code to be applied to said document from a calculation device;

performing a transformation to said marking code;

grouping text symbols of the input document into classes of text elements including at least one of characters, words, and lines;

selecting, according to the content of the document, at least one of said classes of text elements as the class to which space variations are to be applied; and varying the spacing between text elements of the selected class according to the result of said transformation of said marking code so that consecutive individual spaces between said text element of the selected class are of at least two different lengths and said marking code can be determined from the arrangement of said individual spaces.

25. The document marking method of claim 24 wherein the step of inputting a document comprising text symbols separated by spaces comprises the sub-steps of receiving a file comprising data words, each data word corresponding to a text symbol.

26. The document marking method of claim 24 wherein the step of inputting a document comprising text symbols separated by spaces comprises the sub-steps of:

optically scanning a printed document; and forming, in a memory, digital data representative of the scanned image.

27. The document marking method of any of claims 1 to 5, 25, 26, or 17 wherein the step of adjusting spacing between text elements is arranged so that the alignment of columns of text and overall lengths of lines of text of the marked document are the same as those of the input document.

28. A method of producing multiple documents each of which is uniquely marked, according to the method of any of claims 1 to 5, 25, 26 or 17 and including the further steps of receiving a second and subsequent marking code and for each marking code received repeating the method claimed.

29. A document marking method of any of claims 1 to 5, 25, 26 or 17 which minimises visual detraction of the marking method, wherein the class of text elements to which variations of spacing are applied is responsive to directives within the document.

30. The document marking method of any of claims 2 to 5 wherein the marking code is received by electro-optically scanning a printed document bearing indicia representative of a marking code.

31. The document marking system of any of claims 9 to 23 or 19 and further comprising means for printing a marked document.

32. The document marking system of any of claims 9 to 23 or 19, further comprising means responsive to directives within the document for selecting the class of text elements to which variations of spacing are applied.

33. The document marking system of any of claims 9 to 20 or 19, further comprising:

document printing means; and locking means adapted to prevent operation of said document marking means unless a marking code has been received.

34. The document marking system of any of claims 9 to 23 or 19, further comprising:

document printing means;

marking code entry means;

discriminator means adapted to determine if an entered marking code meets pre-determined validity rules; and locking means responsive to the output of said discriminator means and adapted to prevent operation of said document printing means unless a valid marking code has been entered.

35. The document marking system of any of claims 10 to 13 and further comprising:

means for scanning a document bearing text to be used as a marking string; and optical character recognition means adapted to receive signals from said scanning means and send data representative of characters recognised to said marking code receiving means.

* * * * *

UNITED STATES PATENT AND TRADEMARK OFFICE
CERTIFICATE OF CORRECTION

PATENT NO.    :    5,467,447      Page 1 of 3

DATED         :    November 14, 1995

INVENTOR(S)   :    VOGEL

It is certified that error appears in the above-identified patent and that said Letters Patent is hereby corrected as shown below:

Column 15, Line 5:

Reads:

performing a transformation on said series

Should Read:

performing a transformation on said series of binary bits to form data representative of the marking borne by the marked document.

Column 18, Claim 31:

Reads:

31. The document marking system of any of claims 9 to 23 or 19 and further comprising means for printing a marked document.

Should Read:

31. The document marking system of any of claims 9-14, 19, or 21-23 and further comprising means for printing a marked document.

UNITED STATES PATENT AND TRADEMARK OFFICE
CERTIFICATE OF CORRECTION

PATENT NO.    :    5,467,447       Page 2 of 3

DATED         :    November 14, 1995

INVENTOR(S)   :    VOGEL

It is certified that error appears in the above-identified patent and that said Letters Patent is hereby corrected as shown below:

Column 18, Claim 32, Lines 48 and 49:

Read:

32. The document marking system of any of claims 9 to 23 or 19, further comprising means responsive to directives Should Read:

32. The document marking system of any of claims 9-14, 19, or 21-23, further comprising means responsive to directives Column 18, Claim 33, Lines 52 and 53:

Read:

33. The document marking system of any of claims 9 to 20 or 19, further comprising:

Should Read:

33. The document marking system of any of claims 9-14, 19, or 21-23, further comprising:

UNITED STATES PATENT AND TRADEMARK OFFICE
CERTIFICATE OF CORRECTION

PATENT NO.    :    5,467,447
DATED         :    November 14, 1995
INVENTOR(S)   :    VOGEL It is certified that error appears in the above-identified patent and that said Letters Patent is hereby corrected as shown below:

Column 18, Claim 34, Lines 58 and 59:

Read:

34. The document marking system of any of claims 9 to 23 or 19, further comprising:

Should Read:

34. The document marking system of any of claims 9-14, 19, or 21-23, further comprising:

Signed and Sealed this

Eighteenth Day of June, 1996

Attest:

BRUCE LEHMAN

*Attesting Officer*      *Commissioner of Patents and Trademarks*